UNITED STATES PATENT OFFICE.

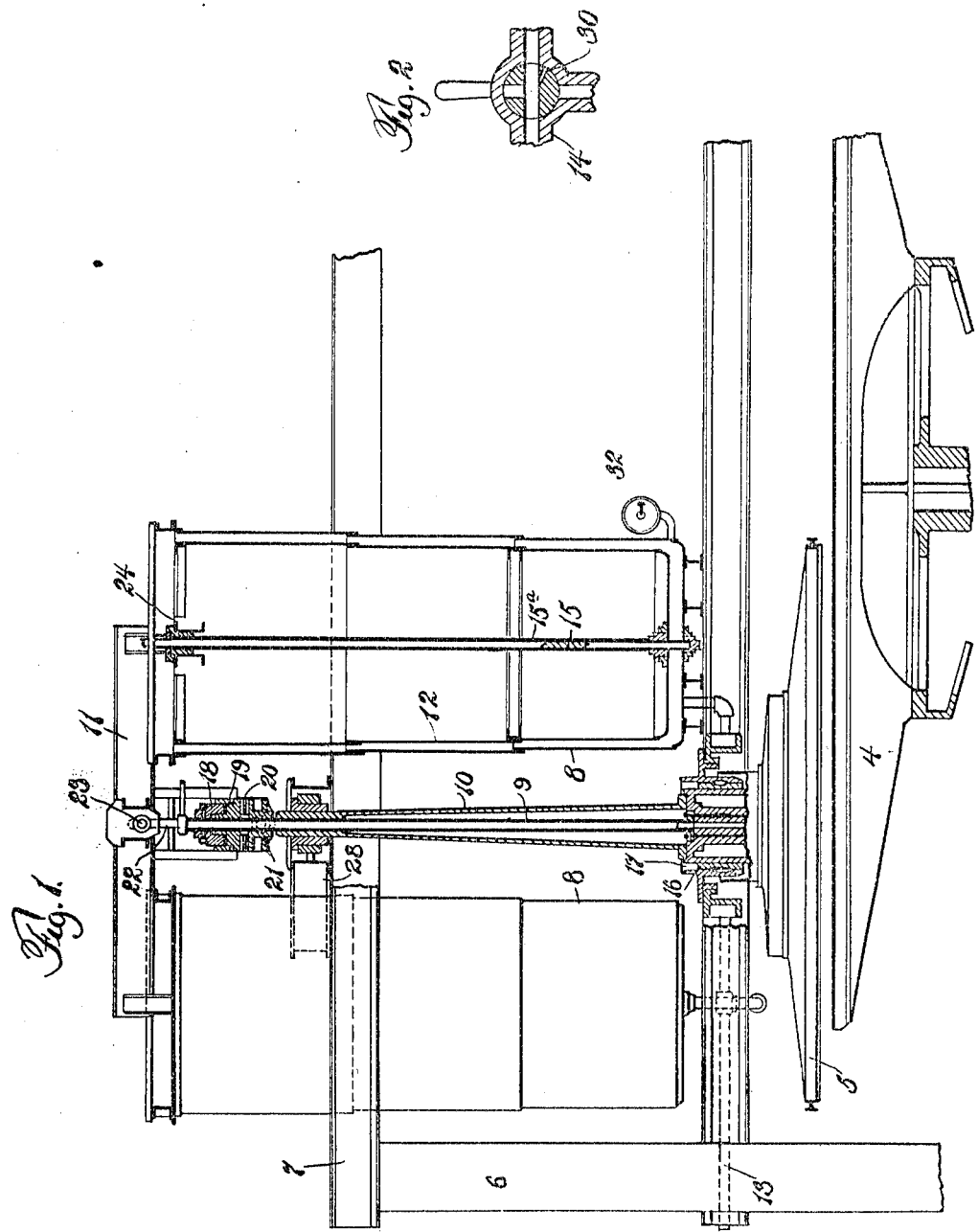

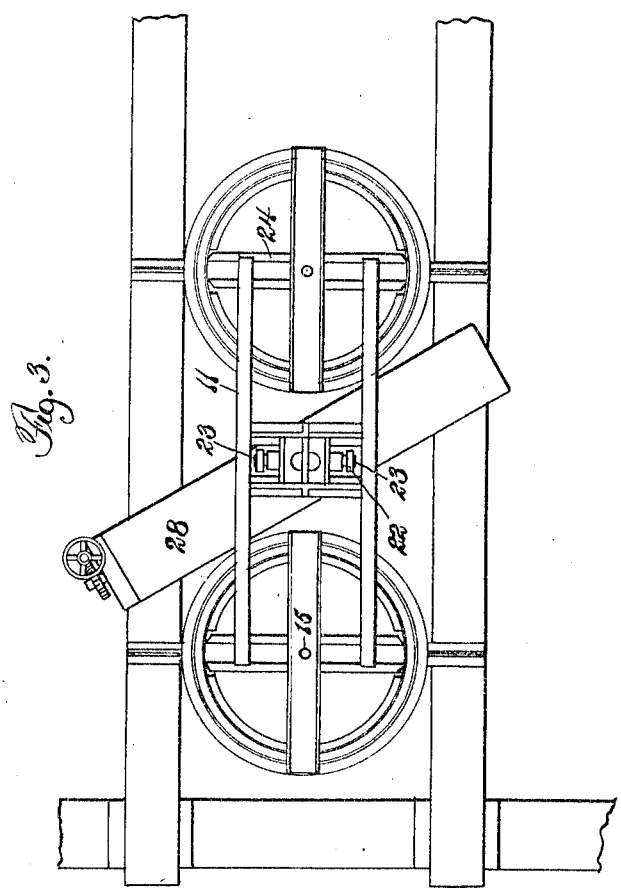

HERMAN S. HEICHERT, OF FORD CITY, PENNSYLVANIA, ASSIGNOR TO PITTSBURGH PLATE GLASS COMPANY, OF PITTSBURGH, PENNSYLVANIA, A CORPORATION OF PENNSYLVANIA.

GRINDING-MACHINE FOR MANUFACTURING PLATE-GLASS.

1,089,924.

Specification of Letters Patent.

Patented Mar. 10, 1914.

Application filed June 1, 1909, Serial No. 499,594. Renewed July 16, 1913. Serial No. 779,392.

*To all whom it may concern:*

Be it known that I, HERMAN S. HEICHERT, a citizen of the United States, residing at Ford City, in the county of Armstrong and State of Pennsylvania, have invented certain new and useful Improvements in Grinding-Machines for Manufacturing Plate-Glass, of which the following is a specification.

This invention has reference to an improved means for supporting the runners used in connection with the grinding tables of a plate glass grinding machine, and has for its primary objects, the provision of an apparatus of the class specified, which will permit of regulation of the pressure of the runners upon the glass with great accuracy and nicety, and allow the raising or lowering of the runners or the alteration of the pressure of the same upon the glass to be obtained with great facility.

A further object of this invention is the provision of a fluid-pressure supporting means for the runners, with manually actuated apparatus for regulating the operation of said supporting means, whereby the work required to manipulate the runner will be materially reduced, and the facility and accuracy greatly increased.

A further object of the invention is the provision of supporting means for the runners whereby the danger of fracturing the glass during the grinding operation is reduced to a minimum.

In connection with the grinding tables heretofore used, which were for the most part of relatively small size, the runners have not been of very great weight, and were operated to be raised and lowered and to have their pressure upon the table adjusted by means of a cross-lever above, and a screwthread device for actuating said cross-lever by the use of a handwheel manipulated by the operator.

In using the apparatus it was necessary, in order to prevent undue breakage of the glass, to start the table slowly and completely cover the glass with a thick coating of sand in order to protect it, as irregularities in the surface of the glass such as high spots coming under the runner would cause a concentration of substantially the entire weight of the runner on such spots, tending to shatter the glass. In overcoming this difficulty counterbalancing tanks of liquid have been employed in which the water ran out of the tanks gradually as the grinding progressed, but in the use of such apparatus it was found that when the tank nearly counterbalanced the weight of the runner and the table rotated rapidly, a slight bump on the glass coming under the runner would cause the runner to move up sharply entirely clearing the glass, the inertia of the runner and counterweight being combined so that on the return movement the runner would strike the glass a hard blow with the combined inertia of the runner and counterweight behind it, thus magnifying the fracturing force of the blow.

This difficulty as to fracturing has increased with the increase in the size of tables and runners incident to the requirements of modern practice, and my invention is designed to do away with these difficulties by the provision of an apparatus such as will permit the application of the pressure of the runner in any desired amount and at the same time resist the tendency of the runner to oscillate violently and crack the glass. This apparatus by reason of the elimination of the violent movement of the runner permits the table to be started at full speed without danger of fracturing the glass, thus reducing the time necessary for grinding. The apparatus also does away with the counterweight and the bad effect due to its inertia, as heretofore set forth.

I preferably accomplish this result by the use of floats. The weight of the floats and decrease in the head of water in the tanks due to the upward movement of the floats, oppose the movement of the runners away from the glass, while the movement of the runners toward the glass is opposed by the inertia of the water displaced upward by the floats and by the increase in head of the water in the float carrying tanks, due to the downward movement of the floats, which causes the resistance to the downward movement of the floats to increase as the runners move down.

While the float means above referred to and herein described constitute the preferred form of my invention, it will be understood that other constructions may be employed for accomplishing the same result, and that my invention comprehends broadly any and all arrangements wherein any movement of the runner toward the table caused by the rotation of the table will be resisted yieldingly at an increasing rate as the runner moves down, and the pressure between the glass and runner correspondingly reduced.

One embodiment of the invention is illustrated in the accompanying drawings wherein—

Figure 1 is a side elevation partly in section, of a mechanism embodying my improvement;

Figure 2 is a sectional detail of the valve actuating device which may be used, and Figure 3 is a plan view of the apparatus indicating the location of the more essential parts.

Referring now more particularly to Figure 1, it will be seen that I have therein shown a grinding table 4 above which are mounted a couple of runners one of which is shown at 5, said runners being located as is customary in this class of apparatus. Adjoining the runners 5 there is a supporting post 6 and a cross-bar 7, which latter is a portion of the stationary frame-work and, to which there are secured a couple of stationary tanks 8 held in place above the runner.

As a means for carrying the weight of the runner I provide an inner suspension tube 9 together with the outer casing tube 10, and attach such suspension devices by means of a swivel or revolving joint, which will be later more specifically described, to a cross-bar 11 that is rested upon or is supported by a couple of floats 12, one in each of the tanks 8.

The floats 12 and the tanks 8 are made of sufficient height and size to afford the requisite degree of buoyancy or support for the runners 5, and as a means for admitting fluid-pressure to the tanks 8 I provide the inlet tube or pipe 13 controlled by means of the operating or regulating valve 14, the presssure preferably employed being hydraulic.

To provide a guide which will avoid lateral swaying of the floats 12 I arrange within the center of each of said floats a vertical guide-bar or upright post 15 surrounded by a tube 15ª movable with the float, dispensing with any stuffing-box. The floats and tanks may be of any preferred or suitable construction, provided only they are of sufficient size and depth to afford the requisite support for the runners, so that when the water which is admitted through the pipe 13 and valve 14 enters between the float and the tank and rises to the requisite height it will when the tank is nearly full have sufficient effect in buoying up the floats, to take all of the weight of the runner and raise the latter off the glass.

The runner is guided near the lower end of the supporting column, by means of a bearing bushing 16 of usual construction, the latter being provided with an oiling recess 17 and any suitable protecting devices to keep the dirt out of the bearing. At the upper end the rod or tube 9 is secured a thrust collar or bearing 18 that rests upon an anti-friction ring 19 which in turn is supported by a kind of universal wedge-shaped supporting bearing 20 carried upon the upper surface of the collar 21 that is suspended by means of two rods 22 and the pins 23 from the cross bar 11 which in turn rests upon the floats 12 by means of suitable cross-bar supports 24.

As a means for changing the angular position of the runner, that is to tilt the runner slightly so that it will (as the term is used in the art) "bite" in grinding on the table, or so that it will in other words have a slight variance from parallel position relative to the surface of the table, I provide means indicated in Figure 3 whereby the part supporting the upper end of the runner shaft can be moved laterally along the bar 28 without interfering with the buoyant action of the floats 12. The specific mechanism employed for shifting the position of the bearing of the upper end of the runner supporting shaft is not essential to my present invention, as any preferred devices suitable for this purpose may be employed, it being only necessary that the change in position of the said bearing parts at the upper end of the runner shaft should not interfere with the free movement of the shaft in the driving or grinding action of the table, and should not in turn interfere with the floating effect or buoyant action of the hydraulic means which I employ for carrying the weight of the runners.

The operation of my improvement is as follows: The parts being substantially as shown in Figure 1, with the valve 14 in position indicated in Figure 2, fluid will pass through the pipe 13 and enter the tank 8 and rise in said tank around the float 12 to such a point that it will at last lift the float 12 and carry upward with it the runner 5, taking all the weight of said runner away from the table and raising it out of contact with the glass on the table.

When now it is desired to start the grinding operation, the valve 14 may be shifted to close the direct passage supplying fluid to the pipe 13, and to open the small port 30 which will allow a small quantity of water to escape from the tanks 8 and by that much reduce the buoyant effect on the runners 5 and allow the runners to descend in contact with the glass, and of course the more water there is allowed to escape from the passage 30 the more of the weight of the runners 5 will rest upon the glass below, and thus the small aperture 30 and the fluid-pressure means coöperating therewith afford a device which will permit of the regulation of the pressure of the runners 5 upon the glass, with the greatest nicety, and also of the gradual increase in pressure upon the glass, without danger of breaking the latter.

It will be seen that the foregoing means will provide for an accurate adjustment for the application of the weight of the runner upon the glass so that the pressure may be gradually and safely increased as the grinding progresses and the glass is smoothed. In case the unevenness of the glass tends to force the runner upward this movement is resisted by the weight of the runner itself and by the added weight of the floats as they are moved upward and the lifting effect of the water reduced so that the pressure between the glass and the runner is increased, thus increasing the grinding effect and reducing the reverse momentum and consequently the tendency to fracture the glass when the runner returns to its normal position. On the other hand when the unevenness of the glass tends to permit the runner to drop below its normal position, the movement of the runner down is resisted by the inertia of the water in the tank. In order to permit the float to move down the level of the water in the tank must move up accordingly, and the inertia of the water thus moved up retards the downward movement of the runner. Furthermore the floats occupy a large proportion of the space in the tanks so that a slight downward movement of a float involves a much greater upward shifting movement of the level of the water in the tank and the increased head correspondingly increases the pressure of the water against the bottom of the float. As a result, the momentum of the runner downward is checked, relieving the pressure between the runner and glass and reducing the danger of fracturing the glass to such an extent that the apparatus may be started at full speed instead of at a very slow speed as is now necessary with the apparatus in common use not provided with the yielding resistance means.

While I have shown a single valve 14 for controlling the various operations of the fluid, it is evident that different valves could be used if desired, a small drain valve being employed to bleed out the pressure gradually to gradually increase the weight of the runner upon the glass, and a separate valve with larger openings used to allow the pressure to flow in to raise the runner or to quickly lower the runner in case it is desired to lower it more rapidly.

As a means for determining the amount of pressure resting upon the glass, I provide a gage 32 which may be located at any convenient place, and serves to indicate the height or pressure of water in the tank 8, which will of course be inversely proportional to the amount of weight of the runner 5 upon the glass. The gage 32 being placed in some convenient or conspicuous position, it is obvious that the foreman in charge of the plant, in passing along can at a glance ascertain the amount of pressure that is being used by the workman, upon the table.

As the bars on the under side of the runners wear down it is with old apparatus a matter of great difficulty to gage the amount of pressure exerted by the runner upon the glass, whereas with my apparatus, by employing markers on the gage it is possible regardless of the amount of wear or other condition of the runners and runner bars, to determine with certainty and great nicety the exact amount of pressure that is being exerted upon the glass. Thus for example if a certain height or pressure of water is sufficient for the runners when the bars are new or but little worn, a reduction in height of said four feet will give the requisite pressure desired under certain conditions, and said four feet reduction in height of the water will give exactly the same amount of pressure regardless of the initial point at which the level of water stood when the runner was exerting no pressure upon the glass.

Having thus described my invention and illustrated its use, what I claim as new and desire to secure by Letters Patent, is the following:

1. In apparatus for grinding plate glass, a table for carrying the glass plate, a runner mounted above the table, a tank, a float therein connected to the runner, and means for supplying fluid to the tank and thereby controlling the pressure of the runner upon the glass plate.

2. In apparatus for grinding plate glass, a table for carrying the glass plate, a runner mounted above the table, a pair of tanks, a pair of floats guided therein and connected to the runner, and means for supplying fluid to the tank and thereby controlling the pressure of the runner upon the glass plate.

3. A runner for glass grinding apparatus, provided with supporting means comprising a pair of hydraulic floats and a cross bar, with means suspending said runner from said cross bar, and means for controlling the hydraulic pressure operating on said floats to determine the pressure of the runner upon the glass.

4. A runner for glass grinding apparatus, provided with supporting means comprising an hydraulic float, means for controlling the hydraulic pressure operating on said float to determine the pressure of the runner upon the glass and means for tilting or inclining said runner with reference to the surface of the glass to be operated upon.

5. In apparatus for grinding surfaces, a rotarily driven table for carrying the member having the surface to be ground, a rotatable runner mounted above the table and exerting pressure downward thereon due to its weight and driven by the table, and yielding means exerting force upon the runner tending to lift it upwardly, and arranged so that the yielding lifting force of the said means increases as the runner moves down.

6. In apparatus for grinding surfaces, a rotarily driven table for carrying the member having the surface to be ground, a rotatable runner mounted above the table and exerting pressure downward thereon due to its weight and driven by the table, yielding resistance means opposing the downward movement of the runner and increasing in amount as the runner moves down, and means whereby the yielding resistance is reduced during the grinding operation.

In testimony whereof I have hereunto signed my name in the presence of two subscribed witnesses.

HERMAN S. HEICHERT.

Witnesses:
HARVEY L. LECHNER,
ARCHWORTH MARTIN.